H. GOLDSCHMIDT & W. BREWITT.
METHOD FOR FORMING PARALLEL FACES ON THE ENDS OF RAILS AND OTHER OBJECTS TO BE BUTT WELDED.
APPLICATION FILED SEPT. 26, 1913.
1,154,918.
Patented Sept. 28, 1915.
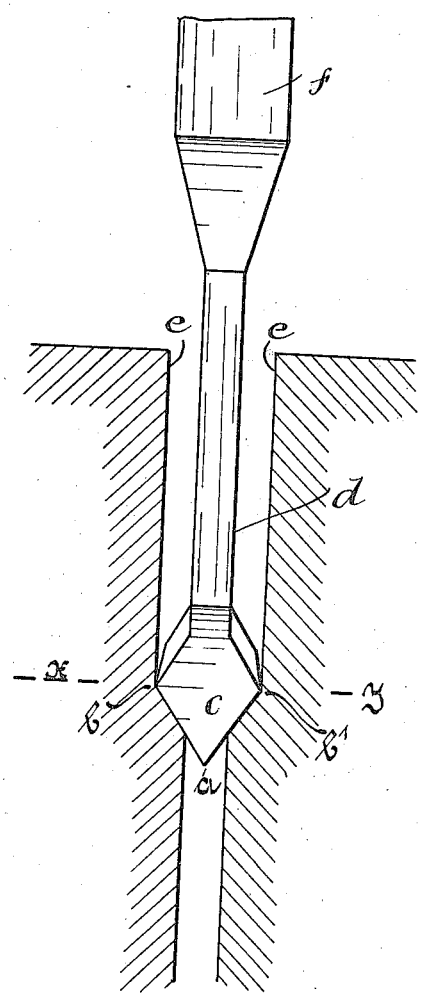
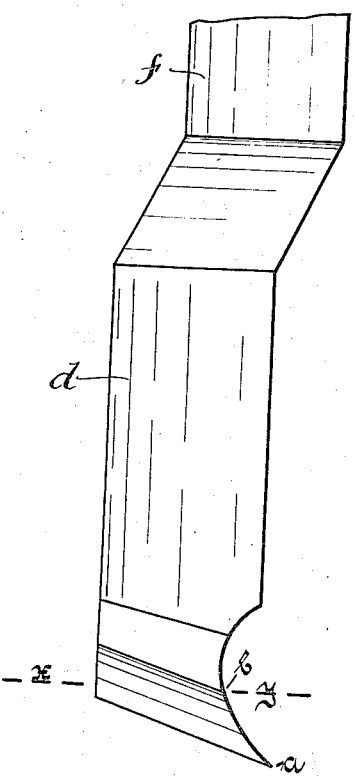
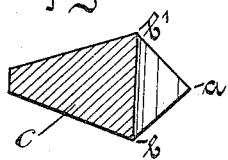

UNITED STATES PATENT OFFICE.

HANS GOLDSCHMIDT AND WALTER BREWITT, OF ESSEN-ON-THE-RUHR, GERMANY, ASSIGNORS TO GOLDSCHMIDT THERMIT COMPANY, OF NEW YORK, N. Y., A CORPORATION OF NEW JERSEY.

METHOD FOR FORMING PARALLEL FACES ON THE ENDS OF RAILS AND OTHER OBJECTS TO BE BUTT-WELDED.

1,154,918.           Specification of Letters Patent.     Patented Sept. 28, 1915.

Application filed September 26, 1913. Serial No. 791,921.

*To all whom it may concern:*

Be it known that we, HANS GOLDSCHMIDT and WALTER BREWITT, subjects of the King of Prussia, and residents of Essen-on-the-Ruhr, in the Province of the Rhine, Germany, have invented a new or Improved Method for Forming Parallel Faces on the Ends of Rails and other Objects to be Butt-Welded, of which the following is an exact specification.

Heretofore tools or devices for simultaneously facing the ends of rails or the like in order to produce parallelism and brightness of the end faces of the rails could only be used in connection with such rails as were movable in the direction of their longitudinal axis by means of a clamping device or similar apparatus. Now, rails already laid in paved roads are immovable and the use of a facing tool enlarges the gap existing between the end faces of the rails. The width of a welded joint must not exceed a certain limit, and the quality of the joint is best when the gap between the pieces to be joined is as narrow as possible. Attempts have been made to reduce to a minimum the width of the gap which results after having used the facing tool, as for example by using a rotary saw, or disk cutter which simultaneously shaped the end faces of the rails. Difficulty has been experienced, however, when using disk cutters for facing hard steel rails, owing to the fact that it was not always possible to keep the tool up to the work on both sides the result being that parallel surfaces could not always be produced. Planing devices comprising a thin groove-cutting tool have been proposed but it was found that the horizontal cutting edges of these tools upon coming into working position suffered from shock and were broken owing to the great pressure and want of a lateral guidance.

Now the object of this invention is to enable the end surfaces to be shaped to exact parallelism by operating with a cutter in a new and improved manner as hereinafter described.

Usually vertical surfaces are operated upon by cutters which are righthanded or lefthanded according to the direction in which they are pressed for performing the operation. Such cutters must be very strong and rigid in order to keep them to the work and they cannot be used in a narrow gap on account of their special shape, their dimensions and the oblique position which it is necessary they should have. Now, according to this invention a pointed vertical tool is employed which does not operate upon the work with its point but by the inclined cutting edges which meet at the point, these cutting edges being simultaneously active upon the opposed faces of the two rail ends. The same effect is obtained whether the cutting tool has a movement in a straight line or over an arc. The shank of this tool can be made very thin because the tool on account of its lateral guidance does not receive any appreciable lateral pressure in one direction or the other. The ends of rails, such as are employed for butt-welding, are usually faced, before they are laid, in such a manner that the faces are at right angles to the longitudinal axis of the rails, and it follows that only a very thin layer has to be removed by the tool in order to obtain bright and parallel surfaces.

The accompanying drawing illustrates to an enlarged scale a suitable cutting-tool by way of example and the manner of working of this cutting tool will be hereinafter more particularly described and ascertained.

Figure 1 is a front elevation of the cutting-tool in the act of operating upon two adjacent surfaces to be butt jointed. Fig. 2 is a side view of the cutting tool and Fig. 3 is a section along the line $x-y$ of Figs. 1 and 2.

The tool consists of a cutting head $c$, a thin neck portion $d$ for entering the narrow gap between the rail ends $e$ and a thick shank portion $f$ for insertion in the tool holder. The relative dimensions of these parts are somewhat exaggerated in order to clearly show the way in which the cutting head operates. The cutting head $c$ has a maximum width at $b\ b'$ and the width is gradually reduced to the point $a$ so that inclined cutting edges $a\ b$ and $a\ b'$ are formed.

The tool is adapted to be fixed in a holder mounted on guides by means of which the tool can be reciprocated transversely of the rails and can be kept accurately in the same path during the operation of facing the rail ends from head to foot, the edges $a\ b\ a\ b'$ commencing their cut at the tread surface on the head and the tool being gradually fed down until the foot is reached.

When the tool is brought to the working position, the point $a$ is introduced into the space between the rail ends and the inclined cutting edges $a\,b$ and $a\,b'$ come into contact with respective rail ends. By reciprocating the cutting tool, metal is removed from both rail ends and the tool is guided on both sides so that it keeps evenly and uniformly in contact with the two surfaces operated upon.

For the reason that the cutting tool does not cut with its point, it is not material to the present invention how the point is shaped. By this means it is possible to produce a narrow space between the ends of rails which are already in position and to face the end surfaces to exact parallelism and to a high degree of brightness the result being one which has not been achieved heretofore. The space between the rail ends prepared in the manner above described can be filled up with a welding piece and welded by an aluminothermic process.

Having now particularly described and ascertained the nature of our said invention and in what manner the same is to be performed, we declare that what we claim is:

1. The method of forming parallel faces on adjacent ends of rails and other objects to be united, consisting in reciprocating a double inclined edge cutting tool between the surfaces to be united and feeding the tool during its reciprocation through said objects until the surfaces are cut to substantial parallelism.

2. The method of forming parallel faces on adjacent ends of rails and other objects to be united, consisting in reciprocating a double inclined edge cutting tool in a straight line between the surfaces to be united and feeding the tool during its reciprocation through said objects until the surfaces are cut to substantial parallelism.

HANS GOLDSCHMIDT. [L. S.]
WALTER BREWITT. [L. S.]

Witnesses:
HELEN NUFER,
ALBERT NUFER.